(12) United States Patent
Takenaka et al.

(10) Patent No.: US 9,503,609 B2
(45) Date of Patent: Nov. 22, 2016

(54) DATA-GENERATING DEVICE, DATA-GENERATING METHOD, DATA-GENERATING PROGRAM AND RECORDING MEDIUM

(75) Inventors: Takamasa Takenaka, Shinagawa-ku (JP); Shinya Takami, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 274 days.

(21) Appl. No.: 13/578,431

(22) PCT Filed: Feb. 24, 2011

(86) PCT No.: PCT/JP2011/054136
§ 371 (c)(1),
(2), (4) Date: Aug. 10, 2012

(87) PCT Pub. No.: WO2011/105483
PCT Pub. Date: Sep. 1, 2011

(65) Prior Publication Data
US 2012/0308075 A1 Dec. 6, 2012

(30) Foreign Application Priority Data
Feb. 26, 2010 (JP) .................. 2010-042192

(51) Int. Cl.
*G06F 21/10* (2013.01)
*G06F 21/84* (2013.01)
*H04N 1/387* (2006.01)

(52) U.S. Cl.
CPC .............. *H04N 1/387* (2013.01); *G06F 21/10* (2013.01); *G06F 21/84* (2013.01)

(58) Field of Classification Search
None
See application file for complete search history.

(56) References Cited

U.S. PATENT DOCUMENTS

| 2003/0063144 | A1* | 4/2003 | Kusakabe | G06T 1/0028 347/15 |
|---|---|---|---|---|
| 2009/0041380 | A1 | 2/2009 | Watanabe et al. | |
| 2009/0154765 | A1 | 6/2009 | Watanabe et al. | |

FOREIGN PATENT DOCUMENTS

| CN | 101365123 A | 2/2009 | |
|---|---|---|---|
| EP | 2 023 333 A2 | 2/2009 | |
| JP | 2002-72994 A | 3/2002 | |
| JP | 2002072994 A * | 3/2002 | ............ G09G 5/00 |
| JP | 2003-264816 A | 9/2003 | |
| JP | 2003264816 A * | 9/2003 | ............ H04N 7/173 |
| JP | 2005-151124 A | 6/2005 | |

* cited by examiner

Primary Examiner — Kee M Tung
Assistant Examiner — Xin Sheng
(74) Attorney, Agent, or Firm — Sughrue Mion, PLLC

(57) ABSTRACT

Data is generated which can prevent content displayed on a screen from being accurately replicated. A data-generating device has: an acquiring means that acquires still image data; a still image data generating means that generates a predetermined number of items of still image data in which at least part of pixel values of the acquired still image data are changed, and that makes an average of pixel values of matching display positions between the predetermined number of items of still image data equal to pixel values of matching display positions in the acquired still image data; and a movie data generating means that generates movie data for which each of the generated still image data is displayed at a predetermined frame rate.

7 Claims, 5 Drawing Sheets

SCREEN DISPLAY IMAGE OF
ELECTRONIC DATA

| R : 220<br>G : 220<br>B : 150 | R : 220<br>G : 220<br>B : 150 | R : 120<br>G : 40<br>B : 90 |
|---|---|---|
| R : 60<br>G : 100<br>B : 200 | R : 60<br>G : 100<br>B : 200 | R : 120<br>G : 40<br>B : 90 |
| R : 60<br>G : 100<br>B : 200 | R : 60<br>G : 100<br>B : 200 | R : 120<br>G : 40<br>B : 90 |

FIG.3B

FRAME 1

| R : 255<br>G : 240<br>B : 160 | R : 255<br>G : 240<br>B : 160 | R : 150<br>G : 55<br>B : 130 |
|---|---|---|
| R : 30<br>G : 180<br>B : 120 | R : 30<br>G : 180<br>B : 120 | R : 150<br>G : 55<br>B : 130 |
| R : 30<br>G : 180<br>B : 120 | R : 30<br>G : 180<br>B : 120 | R : 150<br>G : 55<br>B : 130 |

FRAME 2

| R : 190<br>G : 210<br>B : 110 | R : 190<br>G : 210<br>B : 110 | R : 140<br>G : 30<br>B : 80 |
|---|---|---|
| R : 45<br>G : 80<br>B : 255 | R : 45<br>G : 80<br>B : 255 | R : 140<br>G : 30<br>B : 80 |
| R : 45<br>G : 80<br>B : 255 | R : 45<br>G : 80<br>B : 255 | R : 140<br>G : 30<br>B : 80 |

FRAME 3

| R : 215<br>G : 210<br>B : 180 | R : 215<br>G : 210<br>B : 180 | R : 70<br>G : 35<br>B : 60 |
|---|---|---|
| R : 105<br>G : 40<br>B : 225 | R : 105<br>G : 40<br>B : 225 | R : 70<br>G : 35<br>B : 60 |
| R : 105<br>G : 40<br>B : 225 | R : 105<br>G : 40<br>B : 225 | R : 70<br>G : 35<br>B : 60 |

FIG.4

FRAME 1

| R: 255<br>G: 240<br>B: 160 | R: 205<br>G: 190<br>B: 190 | R: 150<br>G: 55<br>B: 130 |
|---|---|---|
| R: 30<br>G: 180<br>B: 120 | R: 50<br>G: 140<br>B: 220 | R: 70<br>G: 70<br>B: 100 |
| R: 10<br>G: 70<br>B: 210 | R: 85<br>G: 90<br>B: 230 | R: 60<br>G: 0<br>B: 135 |

FRAME 2

| R: 190<br>G: 210<br>B: 110 | R: 230<br>G: 245<br>B: 90 | R: 140<br>G: 30<br>B: 80 |
|---|---|---|
| R: 45<br>G: 80<br>B: 255 | R: 90<br>G: 70<br>B: 170 | R: 145<br>G: 30<br>B: 70 |
| R: 90<br>G: 110<br>B: 240 | R: 50<br>G: 80<br>B: 120 | R: 160<br>G: 20<br>B: 100 |

FRAME 3

| R: 215<br>G: 210<br>B: 180 | R: 225<br>G: 225<br>B: 170 | R: 70<br>G: 35<br>B: 60 |
|---|---|---|
| R: 105<br>G: 40<br>B: 225 | R: 40<br>G: 90<br>B: 210 | R: 145<br>G: 20<br>B: 100 |
| R: 80<br>G: 120<br>B: 150 | R: 45<br>G: 130<br>B: 250 | R: 140<br>G: 100<br>B: 35 |

FIG.5

DATA-GENERATING DEVICE, DATA-GENERATING METHOD, DATA-GENERATING PROGRAM AND RECORDING MEDIUM

CROSS REFERENCE TO RELATED APPLICATIONS

This application is a National Stage of International Application No. PCT/JP2011/054136, filed on Feb. 24, 2011, which claims priority from Japanese Patent Application No. 2010-042192, filed on Feb. 26, 2010, the contents of all of which are incorporated herein by reference in their entirety.

TECHNICAL FIELD

The present invention relates to a technical field of preventing content displayed on a screen from being replicated.

BACKGROUND ART

Conventionally, screen capture (also referred to as, for example, "screen shot" or "screen dump") is known of storing content to be displayed on a screen by display processing of electronic data such as electronic document or images as still image data. This screen capture function is provided by, for example, an operating system, or can be realized by executing screen capture software. Hence, there is a problem that content such as personal information or copyrighted work which is undesirable to be replicated is easily replicated.

Therefore, for example, a method is proposed of restricting browsing of content without browsers to which a function of disabling screen capture is added. However, if a user takes a picture of a screen, it is still possible to replicate display content on the screen.

With regard to this problem, Patent Literature 1 discloses a technique of preventing digital shoplifting of capturing an image of content of a book using a digital camera. More specifically, digital watermark is printed on pages of a book. Further, when the digital camera detects digital watermark from captured images, processing is performed of forbidding storage or transmission of images, or tessellating the captured images or destroying readability of letters.

CITATION LIST

Patent Literature

Patent Literature 1: Japanese Patent Application Laid-Open No. 2005-151124

SUMMARY OF THE INVENTION

Problems to be Solved by the Invention

However, the technique disclosed in Patent Literature 1 requires that a digital camera itself has a function of preventing digital shoplifting. Hence, replication can be carried out by capturing an image using a digital camera without this function.

In light of the above foregoing problems, it is therefore an object of the present invention to provide a data-generating device, a data-generating method, a data-generating program and a recording medium, for generating data which can prevent content displayed on a screen from being accurately replicated.

Means for Solving the Problems

In order to solve the problems, the invention according to claim 1 is a data-generating device comprising:

an acquiring means that acquires still image data;

a still image data generating means that generates a predetermined number of items of still image data in which at least part of pixel values of the acquired still image data are changed, and that makes an average of pixel values of matching display positions between the predetermined number of items of still image data equal to pixel values of matching display positions in the acquired still image data; and a movie data generating means that generates movie data for which each of the generated still image data is displayed at a predetermined frame rate.

According to the present invention, the generated movie data is played back, so that a predetermined number of items of still image data are sequentially displayed at predetermined time intervals. Hence, even when display content on the screen at a given moment is replicated by screen capture or image capturing, content to be replicated is only the same as display content of one still image data of the predetermined number of items of still image data in which colors of at least part of pixels are changed from the acquired still image data. Meanwhile, a predetermined number of items of still image data are sequentially displayed at predetermined time intervals, so that a color indicated by an average of pixel values of a predetermined number of items of still image data is recognized at each display position of the pixel by people who look at the screen and, consequently, it is possible to make those people recognize display content of the acquired original still image data. Consequently, it is possible to prevent content displayed on the screen from being accurately replicated.

The invention according to claim 2 is the data-generating device according to claim 1, wherein the still image data generating means determines a pixel value of the predetermined number of items of still image data such that each pixel value has an irregular value.

The invention according to claim 3 is the data-generating device according to claim 1 or 2, wherein the still image data generating means varies a pattern of a pixel value to be set in the predetermined number of items of still image data for the same pixel value between at least two of a plurality of regions divided from an image shown by the acquired still image data.

According to the present invention, a plurality of pixels having the same color in the acquired original still image data have different colors from each other in the generated still image data, so that it is possible to make recognition of display content of the acquired original still image data from the replicated content difficult.

The invention according to claim 4 is the data-generating device according to any one of claims 1 to 3, wherein the still image data generating means converts each pixel value of the acquired still image data to reduce the difference between a minimum value and a maximum value of a pixel value, and makes an average of pixel values of matching display positions between the predetermined number of items of still image data equal to the pixel values after the conversion.

When the pixel value of the acquired original still image data has the same value as the minimum value or the maximum value in a range which the pixel value can take, it is necessary to sufficiently decrease the difference between pixel values of a predetermined number of items of still image data to generate and the pixel value of the original still image data in order to settle the difference between the average of pixel values of a predetermined number of items of still image data and the pixel values of the original still image data in a predetermined range (for example, the range is ±10 when the difference between the minimum value and the maximum value of a brightness value is 225). By contrast with this, according to the present invention, when a pixel value is converted, the minimum value of the pixel value becomes higher than the pixel value before conversion or the maximum value of the pixel value becomes smaller than the pixel value before conversion, so that it is possible to make the difference between pixel values of still image data to generate and pixel values of the original still image data greater than the difference before conversion. Consequently, it is possible to prevent content displayed on the screen from being accurately replicated.

The invention according to claim 5 is the data-generating device according to any one of claims 1 to 4, wherein the still image data comprises a brightness value as a pixel value per primary color based on which a color of a pixel is represented, and the still image data generating means makes, per primary color, an average of brightness values of pixels of matching display positions between the predetermined number of items of still image data equal to a brightness value of a pixel of a matching display position in the acquired still image data.

The invention according to claim 6 is the data-generating device according to any one of claims 1 to 5, wherein the movie data generating means comprises a frame rate determining means that determines a frame rate for display, and the still image data generating means comprises a generation image number determining means that determines a number of items of still image data to generate based on the determined frame rate.

According to the present invention, it is possible to determine a number suitable for the frame rate as the number of items of still image data configuring movie data. Consequently, it is possible to make adjustment to make recognition of display content on the screen easy for people who look at the screen.

The invention according to claim 7 is the data-generating device according to any one of claims 1 to 6, wherein the acquiring means comprises:

an electronic data acquiring means that acquires electronic data which can be displayed on a screen of a display device; and a converting means that converts the acquired electronic data into still image data.

According to the present invention, even when electronic data is not still image data, it is possible to prevent display content of electronic data on the screen from being accurately replicated.

The invention according to claim 8 is a data-generating method comprising:

an acquiring step of acquiring still image data;

a still image data generating step of generating a predetermined number of items of still image data in which at least part of pixel values of the acquired still image data are changed, and making an average of pixel values of matching display positions between the predetermined number of items of still image data equal to pixel values of matching display positions in the acquired still image data; and a movie data generating step of generating movie data for which each of the generated still image data is displayed at a predetermined frame rate.

The invention according to claim 9 is a data-generating program causing a computer to function as:

an acquiring means that acquires still image data;

a still image data generating means that generates a predetermined number of items of still image data in which at least part of pixel values of the acquired still image data are changed, and that makes an average of pixel values of matching display positions between the predetermined number of items of still image data equal to pixel values of matching display positions in the acquired still image data; and a movie data generating means that generates movie data for which each of the generated still image data is displayed at a predetermined frame rate.

The invention according to claim 10 is a recording medium having a computer-readable data-generating program recorded which causes a computer to function as:

an acquiring means that acquires still image data;

a still image data generating means that generates a predetermined number of items of still image data in which at least part of pixel values of the acquired still image data are changed, and that makes an average of pixel values of matching display positions between the predetermined number of items of still image data equal to pixel values of matching display positions in the acquired still image data; and a movie data generating means that generates movie data for which each of the generated still image data is displayed at a predetermined frame rate.

Advantageous Effects of Invention

According to the present invention, the generated movie data is played back, so that a predetermined number of items of still image data are sequentially displayed at predetermined time intervals. Hence, even when display content on the screen at a given moment is replicated by screen capture or image capturing, content to be replicated is only the same as display content of one still image data of the predetermined number of items of still image data in which colors of at least part of pixels are changed from the acquired still image data. Meanwhile, a predetermined number of items of still image data are sequentially displayed at predetermined time intervals, so that a color indicating an average of pixel values of a predetermined number of items of still image data is recognized at each display position of the pixel by people who look at the screen. Consequently, it is possible to make those people recognize display content of the acquired original still image data. Consequently, it is possible to prevent content displayed on the screen from being accurately replicated.

EMBODIMENTS FOR CARRYING OUT THE INVENTION

Hereinafter, an embodiment of the present invention will be described in details with reference to the drawings. In addition, the embodiment will be described below where/a data-generating device according to the present invention is applied to an electronic data converting device.

[1. Configuration of Electronic Data Converting Device]

First, a configuration of an electronic data converting device 1 according to the present embodiment will be described using FIG. 1.

Figure 1:
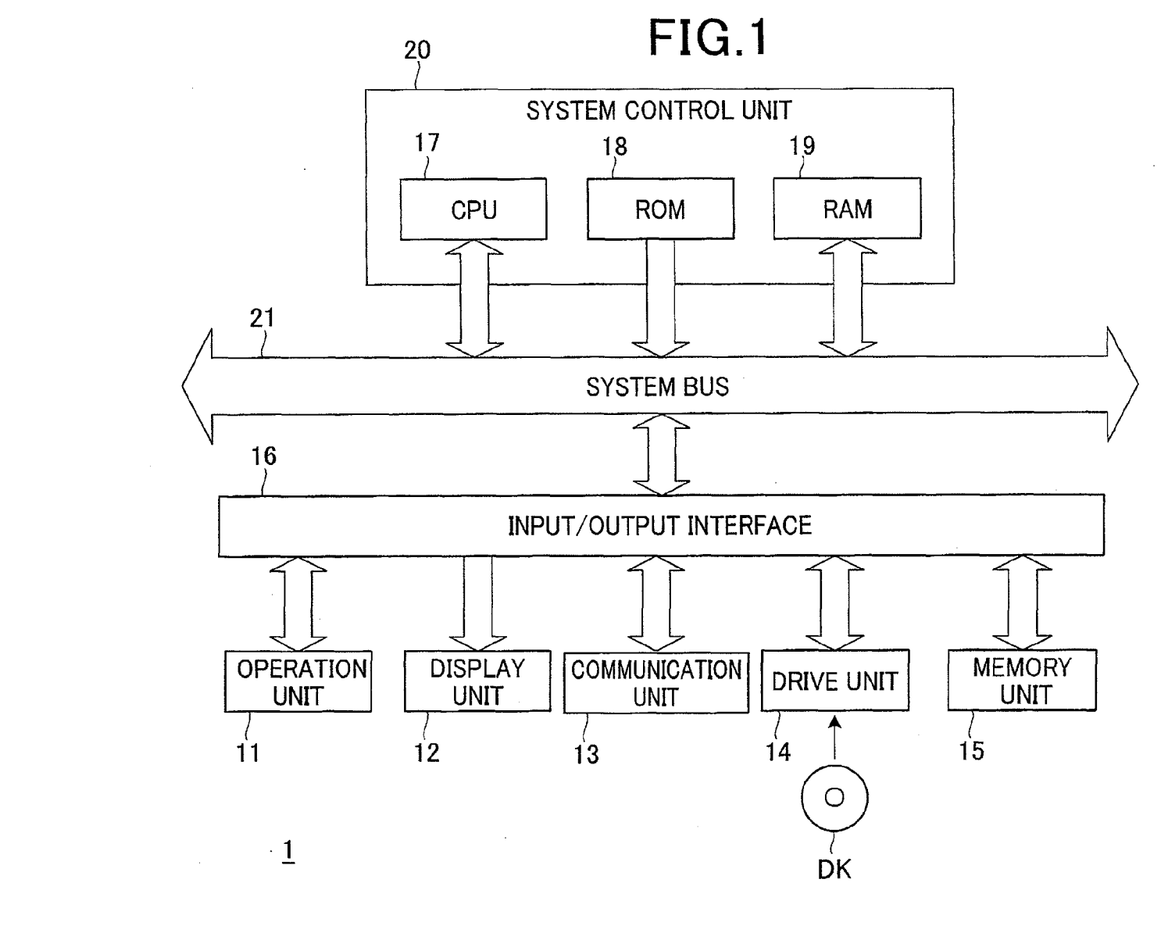
FIG. 1 is a block diagram illustrating an example of a schematic configuration of an electronic data converting device 1 according to one embodiment.

FIG. 1 is a block diagram illustrating an example of a schematic configuration of an electronic data converting device 1 according to the present embodiment.

As illustrated in FIG. 1, the electronic data converting device 1 has an operation unit 11, a display unit 12, a communication unit 13, a drive unit 14, a memory unit 15, an input/output interface unit 16 and a system control unit 20. Further, the system control unit 20 and the input/output interface unit 16 are connected through a system bus 21.

The operation unit 11 employs a configuration including, for example, a keyboard and a mouse, and receives an operation command from a user and outputs content of the command to the system control unit 20 as a command signal. The display unit 12 is, for example, a computer display such as a CRT (Cathode Ray Tube) display or a liquid crystal display, and displays information such as characters and images. The communication unit 13 connects to a network such as a LAN (Local Area Network) to control communication states with other information processing devices. The drive unit 14 reads, for example, data from a disc DK such as a flexible disc, a CD (Compact Disc) or a DVD (Digital Versatile Disc), and records, for example, data in the disc DK.

The memory unit 15 employs a configuration including, for example, a hard disc drive, and stores, for example, various programs (including an example of a data-generating program according to the present invention) and data. The programs stored in the memory unit 15 may be acquired from, for example, another information processing device through the network, or may be recorded in the disc DK and read through the drive unit 14. The input/output interface unit 16 performs interface processing between the operation unit 11 to the memory unit 15, and the control unit 20. The system control unit 20 is formed with, for example, a CPU (Central Processing Unit) 17, a ROM (Read Only Memory) 18 and a RAM 19. When the CPU 17 reads and executes the various programs stored in the ROM 18 or the memory unit 15, the system control unit 20 controls each unit of the electronic data converting device 1. Further, the system control unit 20 functions as acquiring means, still image data generating means, movie data generating means, frame rate determining means, generation image number determining means, electronic data acquiring means and converting means according to the present invention.

For the electronic data converting device, for example, a personal computer or a server device can be adopted.

[2. Outline of Function of Electronic Data Converting Device]

Next, the outline of a function of the electronic data converting device 1 according to the present embodiment will be described using FIGS. 2 to 4.

Figure 2:
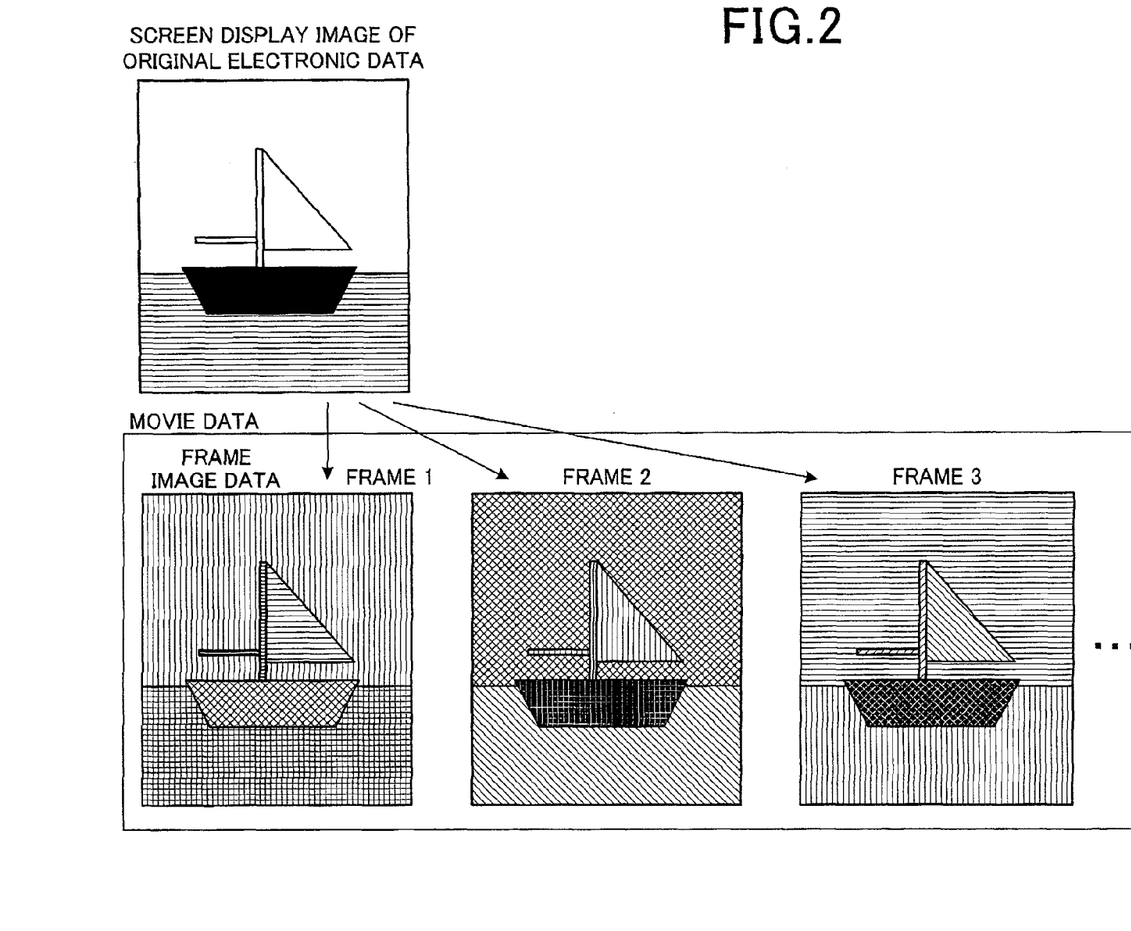
FIG. 2 is a view illustrating examples of a screen display image of electronic data and a display image of frame image data configuring movie data according to one embodiment.

FIG. 2 is a view illustrating examples of a screen display image of electronic data and a display image of frame image data configuring movie data according to the present embodiment. Further, FIG. 3A is a view illustrating a setting example of a brightness value of a pixel of a screen display image of electronic data, and FIG. 3B is a view illustrating a setting example of a brightness value of a pixel of each frame image data. Furthermore, FIG. 4 is a view illustrating another setting example of a brightness value of a pixel of each frame image data.

The electronic data converting device 1 converts specified electronic data into movie data. The type of electronic data of a conversion target is not particularly limited as long as the electronic data can be displayed on the screen. For example, electronic data of a conversion target includes, for example, electronic document, image data and web pages (more specifically, HTML document configuring web pages, image data, electronic document and text data). In addition, an example of a screen display image of electronic data illustrated in FIG. 2 is a screen display image of a given color still image.

More specifically, when people look at a screen of the computer display which displays a movie by movie data playback processing, the electronic data converting device 1 generates movie data which allows people to recognize the same image as the screen display image of electronic data with their own eyes. Further, even when an action such as screen capture or image capturing is taken while movie data is displayed (hereinafter, referred to as "screen replication action"), the electronic data converting device 1 generates movie data from which the screen display image of electronic data cannot be accurately replicated.

More specifically, as illustrated in FIG. 2, movie data configured with a plurality of items of frame image data is generated from still image data corresponding to a screen display image of electronic data. Each frame image data is still image data and, when movie data is played back, a plurality of items of frame image data configuring movie data are sequentially displayed on the screen at a predetermined frame rate and repeatedly displayed. For a format of such movie data, for example, SWF (Small Web Format) of Adobe Flash (registered trademark) may be adopted. Meanwhile, the format of movie data is by no means limited to a specific format.

Each frame image data configuring movie data is still image data in which the color of each pixel is changed to a color different from a color of a pixel at the same coordinate as the original still image data corresponding to the screen display image of electronic data. More specifically, the color of the pixel is represented by a combination (an example of pixel values according to the present invention) of brightness values of R (red), G (green) and B (blue) which are three primary colors of light. A brightness value of each frame image data is set such that a brightness value of at least one primary color of R, G and B differs from each other between pixels at the same coordinate in a screen display image of electronic data and frame image data.

Further, when a brightness value of an arbitrary primary color of an arbitrary coordinate of a screen display image of electronic data is L and a brightness value of the same primary color at the same coordinate as the screen display image of electronic data is $l_i$ in frame image data of a frame number i, $l_i$ is set to satisfy following equation (1).

[Equation 1]

$$L = \sum_{i=1}^{FN} l_i / FN \qquad (1)$$

In above each equation, FN is a number of frames of movie data. The number of frames is the number of items of frame image data configuring movie data. As represented in equation (1), the average of brightness values of pixels of matching coordinates between FN items of frame image data matches with brightness values of pixels of matching coordinates in a screen display image of electronic data.

Figure 3A:
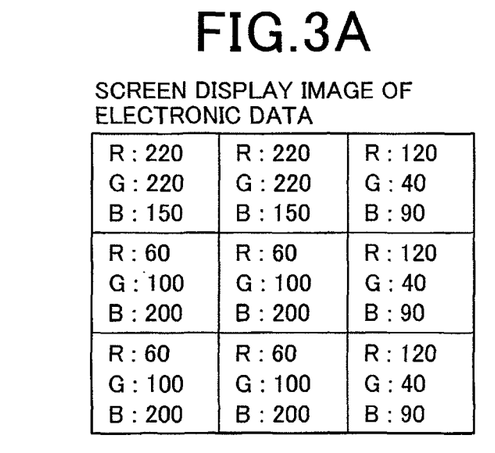
FIG. 3A is a view illustrating a setting example of a brightness value of a pixel of a screen display image of electronic data.
Figure 3B:
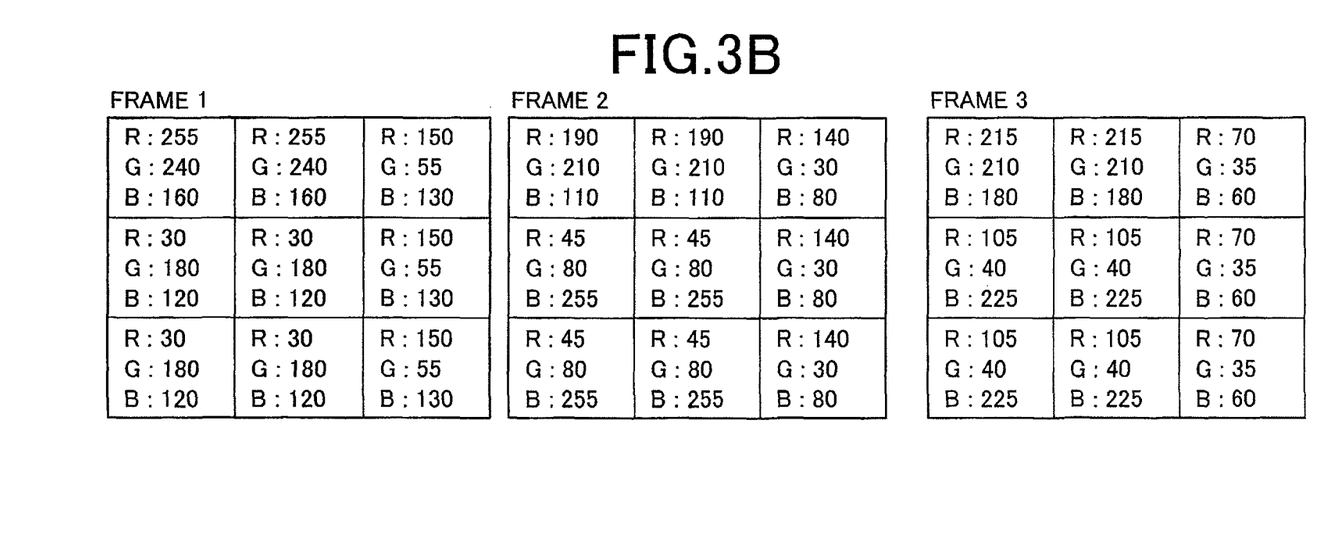
FIG. 3B is a view illustrating a setting example of a brightness value of a pixel of each frame image data.
Figure 4:
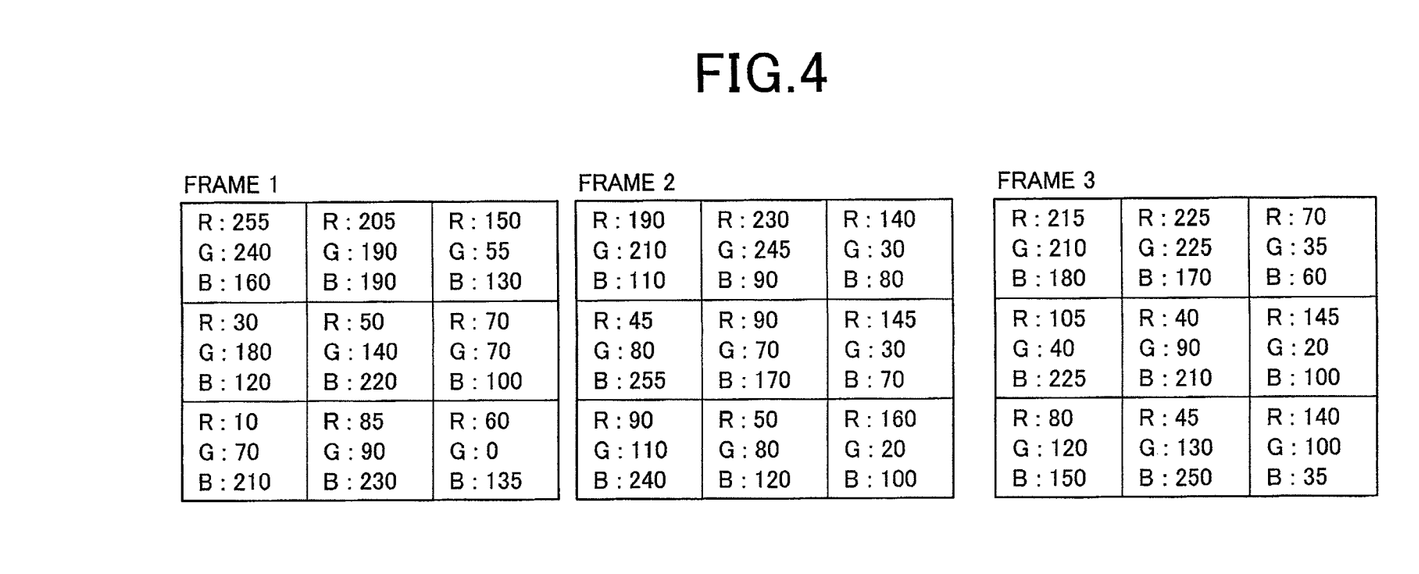
FIG. 4 is a view illustrating another setting example of a brightness value of a pixel of each frame image data.

FIG. 3 illustrates a setting example of a brightness value of each frame image data when the number of frame is 3. In addition, FIG. 3 illustrates an example where the minimum value of a brightness value is 0 and the maximum value of a brightness value is 255, and illustrates that a color is brighter when a brightness value is higher. FIG. 3A illustrates brightness values of R, G and B of nine pixels at given coordinates of a screen display image of electronic data. Further, FIG. 3B illustrates brightness values of R, G and B at the same coordinates as pixels for which the brightness values are shown in FIG. 3A in each frame image data. As illustrated in FIG. 3, between coordinates having the same combinations of brightness values of R, G and B in a screen display image of electronic data (that is, same color), combinations of the same brightness values are also set in frame image data. That is, between coordinates having the same combinations of brightness values in a screen display image of electronic data, a setting pattern of a brightness value of each frame image data is also the same. For example, as illustrated in FIG. 3A, combinations of brightness values of pixels in one row at a right end are the same, and, as illustrated in FIG. 3B, combinations of brightness values of pixels in one row at a right end are also the same in each frame image data. In order to enable such a setting of brightness values, for example, the system control unit 20 may set brightness values of R, G and B in each frame image data by using a conversion table indicating setting patterns of brightness values of R, G and B for each frame image data according to each color on the screen display image of electronic data. This conversion table may be stored in the memory unit 15 in advance or may be created by the system control unit 20 upon generation of movie data. Further, for example, the system control unit 20 may use a conversion table indicating setting patterns of brightness values for each frame image data according to each brightness on a screen display image of electronic data. In this case, it is possible to reduce the table size.

One of items of frame image data configuring movie data is displayed on a screen at a given moment when this movie data configured by such frame image data is played back. Hence, even when a display image on a screen at a given moment is replicated by a screen replication action, the color of each pixel of an image to be replicated differs from a color of a pixel at the same coordinate on the screen display image of the original electronic data. Consequently, the screen display image of electronic data cannot be accurately replicated. By contrast with this, each frame image data configuring movie data is sequentially displayed at predetermined time intervals, so that people who look at the screen recognize that a color averaging colors indicated by a combination of brightness values of R, G and B of pixels of each frame image is displayed at each coordinate. By this means, it is possible to make people who look at the screen recognize that a screen display image of the original electronic data is displayed.

By the way, when the brightest white and the darkest black are included in a screen display image of electronic data, all of brightness values of R, G and B of pixels have the same value as the minimum value in the range the brightness values can take or the same value as the maximum value. Then, it is necessary to set the minimum value or the maximum value for each frame image data as a brightness value, and therefore there is a portion where the colors of all items of frame image data are the same as the colors of the screen display image of the original electronic data.

Hence, the gradation of a screen display image of electronic data may be compressed and converted before the system control unit 20 generates frame image data. Compression conversion of the gradation is directed to reducing the range of the gradation, that is, the difference between the minimum value and the maximum value of the brightness value, and decreasing the contrast. More specifically, when the minimum value of a brightness value is 0, the maximum value of the brightness value is Lmax, the brightness value before compression conversion of an arbitrary primary color is L1 and the brightness value after compression conversion is L2, L2 is calculated according to following equation (2) or following equation (3).

[Equation 2]

In case where $L1 < Lmax/2$ $$L2 = L1 + \left(\frac{K}{Lmax/2} \times (Lmax/2 - L1)\right) \qquad (2)$$

[Equation 3]

In case where $L1 > Lmax/2$ $$L2 = L1 - \left(\frac{K}{Lmax/2} \times (L1 - Lmax/2)\right) \qquad (3)$$

In the above equations, K is a constant having a value equal to or more than 1. According to equation (2) or equation (3), the brightness value approximates to Lmax/2. Further, the brightness value which is 0 before conversion becomes K after conversion, and the brightness value which is Lmax before conversion becomes Lmax−K after conversion. Furthermore, a margin corresponding to K is produced at minimum between L2 and the minimum value of the brightness value and between L2 and the maximum value of the brightness value, so that it is possible to vary the color of each frame image data from the color of a screen display image of the original electronic data. In addition, the gradation may be compressed and converted using an algorithm other than the algorithms indicated in the above equation (2) and equation (3). Further, compression conversion may be performed such that other brightness values approximate to the minimum value, without changing the minimum value of the brightness value. Furthermore, compression conversion may be performed such that other brightness values approximate to the maximum value, without changing the maximum value of the brightness value.

Still further, with the example of FIG. 3B, when a combination of the same brightness values in frame image data is set between coordinates having the same combinations of brightness values in a screen display image of electronic data, for example, a character or a pattern is more likely to be recognized from one frame image data in some cases. Hence, as illustrated in, for example, FIG. 4, setting patterns of brightness values of R, G and B for each frame image data may be determined per coordinate at random. That is, setting patterns of brightness values per coordinate may be set as irregular setting patterns. By so doing, it is possible to change the setting patterns of the brightness value per coordinate and vary colors on frame image data between a plurality of pixels having the same color on the screen display image of electronic data.

Next, a method of determining a frame rate and the number of frames of movie data to generate will be described. The frame rate and the number of frames may be set by each user or may be automatically determined by the electronic data converting device 1, or a value determined in advance as a fixed value may be stored in the memory unit 15.

When the frame rate is determined by the electronic data converting device 1, the system control unit 20 first acquires, for example, an assumable refresh rate (vertical synchronization frequency) of the computer display. This refresh rate may be inputted by, for example, the user. Instead, when the electronic data converting device 1 targets at playing back movie data, the system control unit 20 may acquire the setting of a current refresh rate of the display unit 12. Further, the system control unit 20 determines the frame rate based on the acquired refresh rate. More specifically, the frame rate is the same value as or less than the refresh rate. Further, for example, the frame rate may be the same value as one of the divisors of the refresh rate. By so doing, it is possible to prevent an image from flickering when movie data is played back. However, in some cases, when the frame rate is too low and movie data is played back, people who look at the screen have difficulty in recognizing a screen display image of the original electronic data. Hence, a lower limit value which can be determined as a frame rate may be set. In this case, the system control unit 20 determines the frame rate such that the frame rate is a lower limit value or more. When, for example, the refresh rate is 60 Hz and the lower limit value of the frame rate is 24 fps, the frame rate is 30 fps or 60 fps.

When the electronic data converting device 1 determines the number of frames, for example, the system control unit 20 determines the number of frames based on the frame rate. By displaying all items of frame image data, people can recognize the same color as the color of each pixel of a screen display image of the original electronic data, so that, when the number of frames is increased, if the time required to display all items of frame image data becomes long, recognition of a screen display image of the original electronic data becomes difficult in some cases. Hence, for example, an upper limit value of a time required to display all items of frame image data is set in advance. Further, the system control unit 20 determines the number of frames such that the time required when all items of frame image data are sequentially displayed at the determined frame rate is the set upper limit value or less. In this case, when the frame rate is higher, the number of frames can be set greater.

The electronic data converting device 1 may have a function of, when the user determines the frame rate and the number of frames, allowing the user to adjust the frame rate and the number of frames while checking the movie displayed on the display unit 12, by playing back the generated movie data.

[3. Operation of Electronic Data Converting Device]

Next, the operation of the electronic data converting device 1 will be described using FIG. 5.

Figure 5:
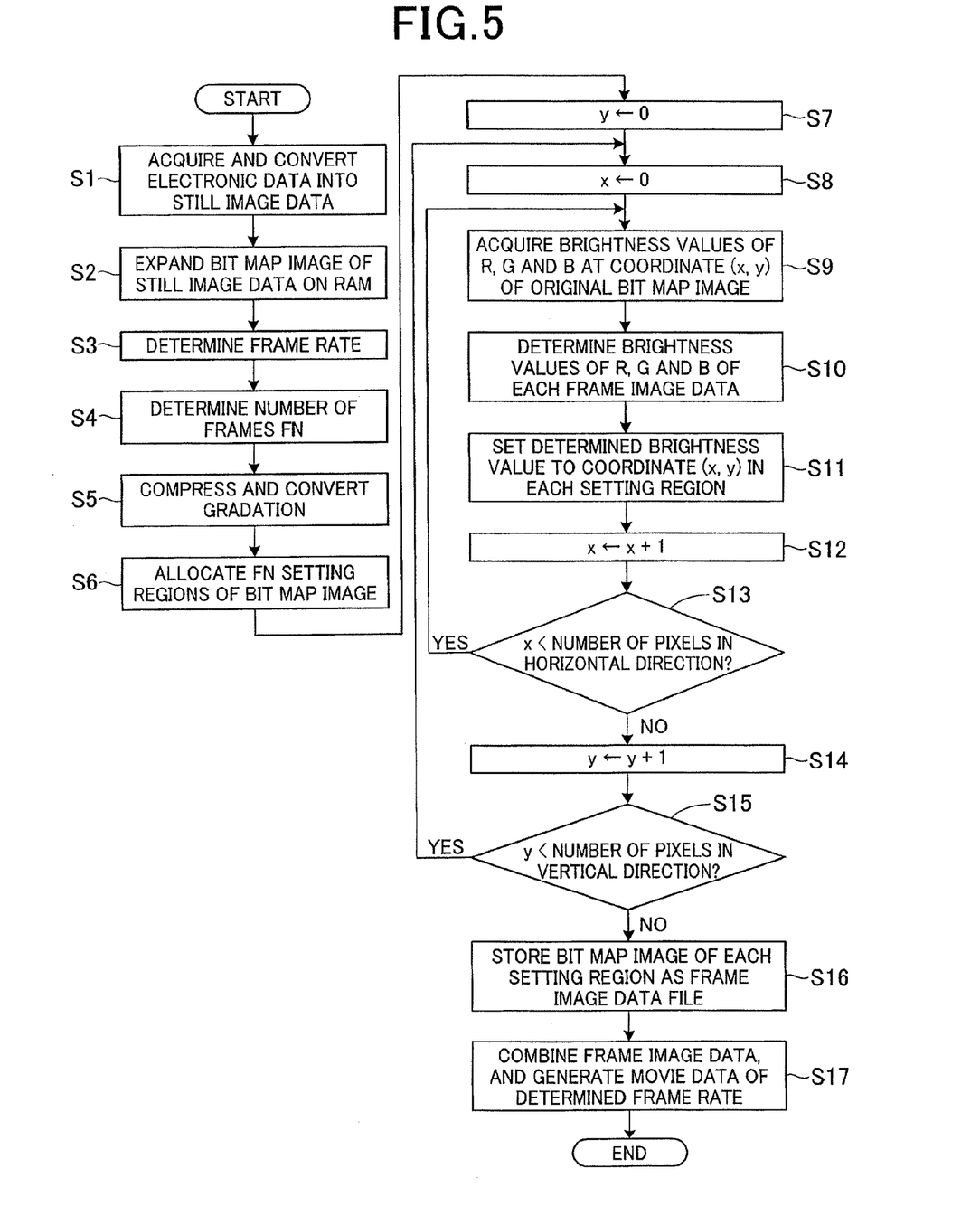
FIG. 5 is a flowchart illustrating a processing example of a system control unit 20 of the electronic data converting device 1 according to one embodiment.

FIG. 5 is a flowchart illustrating a processing example of the system control unit 20 of the electronic data converting device 1 according to the present embodiment. In addition, the flowchart illustrated in FIG. 5 indicates processing when a setting pattern of a brightness value for each frame image data is determined per coordinate at random.

First, the system control unit 20 functions as acquiring means to acquire electronic data, and convert the acquired electronic data into still image data (step S1). More specifically, the system control unit 20 functions as electronic data acquiring means to acquire, for example, electronic data specified according to a user's operation of the operation unit 11. In this case, the system control unit 20 may acquire electronic data from, for example, another information processing device through the communication unit 13 and the network, may read electronic data from the disc DK through the drive unit 14 or may acquire electronic data stored in the memory unit 15. Further, the system control unit 20 functions as converting means to, for example, rasterize the acquired electronic data, generate still image data and store the still image data in the memory unit 15 as a data file of a predetermined format. The format of still image data includes, for example, a JPEG format, a TIFF format and a BMP format. Further, the system control unit 20 finds the numbers of pixels of the generated still image data in the vertical and horizontal directions, and the total number of pixels. In addition, when the acquired electronic data is still image data, the system control unit 20 can skip conversion processing.

Next, the system control unit 20 expands a bit map image of the generated still image data on a predetermined region of the RAM 19 (step S2). This bit map image is, for example, data adopting an alignment structure in which brightness values of R, G and B are set according to each coordinate. This bit map image corresponds to a screen display image of electronic data. In addition, when electronic data is converted into still image data, the system control unit 20 can also set still image data directly in the RAM 19 as a bit map image instead of temporarily storing still image data as a data file.

Next, the system control unit 20 functions as still image data generating means to generate a plurality of items of frame image data in steps S3 to S16.

First, the system control unit 20 functions as frame rate determining means to determine a frame rate of movie data to generate, based on an assumable refresh rate of the computer display (step S3). Next, the system control unit 20 functions as generation image number determining means to determine the number of frames FN of movie data to generate, based on the determined frame rate (step S4). In addition, the example of the method of determining the frame rate and the number of frames has already been described, and therefore will not be described here.

Next, the system control unit 20 compresses and converts the gradation (step S5). More specifically, the system control unit 20 calculates a brightness value after conversion by substituting bright values of R, G and B of each pixel of the expanded bit map image in the equation (2) or (3). Further, the system control unit 20 overwrites the brightness value of the bit map image using the calculated brightness value.

Next, the system control unit 20 allocates FN setting regions of the bit map image of frame image data to a memory space on the RAM 19 (step S6).

Next, the system control unit 20 sets 0 to a variable y indicating a Y coordinate (step S7), and sets 0 to a variable x indicating an X coordinate (step S8).

Next, the system control unit 20 acquires brightness values of R, G and B of a pixel at a coordinate (x,y) from the original bit map image expanded in step S2 (step S9). Next, the system control unit 20 determines a bright value to be set in each frame image data at random such that the above equation (1) is satisfied for R, G and B (step S10). Next, the system control unit 20 sets the determined brightness values as the brightness values at the coordinate (x,y) in each setting region (step S11).

Next, the system control unit 20 adds 1 to the variable x (step S12), and decides whether or not the variable x is smaller than a value of the number of pixels acquired in step S1 in the horizontal direction (step S13). In this case, the system control unit 20 proceeds to step S9 when the variable x is smaller than the value of the number of pixels in the horizontal direction (step S13: YES).

Meanwhile, the system control unit 20 adds 1 to the variable y (step S14) when the variable x is a value or the number of pixels in the horizontal direction or more (step S13: NO). Next, the system control unit 20 decides whether the variable y is smaller than the value of the number of pixels acquired in step S1 in the vertical direction (step S15). In this case, the system control unit 20 proceeds to step S8 when the variable y is smaller than the value of the number of pixels in the vertical direction (step S15: YES).

Meanwhile, when the variable y is the value of the number of pixels in the vertical direction or more (step S15: NO), the system control unit 20 stores the bit map image set in each setting region in the memory unit 15 as a frame image data file of each predetermined format (step S16).

Next, the system control unit 20 functions as movie data generating means to generate movie data (step S19). More specifically, the system control unit 20 combines each frame image data of the generated frame 1 to frame FN to generate movie data. In this case, the system control unit 20 sets the determined frame rate to, for example, the frame rate setting portion in movie data. In addition, a configuration may be employed where each of the above frame image data may be regularly combined in, for example, an ascending order or a descending order based on the frame number, or may be combined at random without referring to the frame number. The system control unit 20 finishes processing illustrated in FIG. 5 when movie data is generated in this way.

The generated movie data can be played back by an information processing device which can play back data of a corresponding format. This information processing device plays back the generated movie data, so that frame image data included in movie data is sequentially displayed on the screen at, for example, the frame rate set in the movie data in combination order of the frame 1, the frame 2 and the frame 3. Further, after the last frame image data is displayed, the first frame image data is displayed again.

As described above, with the present embodiment, the system control unit 20 acquires still image data which shows a screen display image of electronic data as a bit map image, and generates a number of items of frame image data in which brightness values which are at least part of pixels of the acquired still image data are changed, according to the determined number of frames. In this case, the system control unit 20 makes the average of brightness values of pixels of matching coordinates between frame image data equal to brightness values of pixels of a screen display image of the original electronic data. Further, the system control unit 20 generates movie data for which the generated frame image data is displayed at the determined frame rate.

Consequently, even when a screen display image at a given moment is replicated due to a screen replication action, the replicated screen display image is only the same as the screen display image of one frame image data in which colors of at least part of pixels are changed from the screen display image of the original electronic data. By contrast with this, people who look at the screen recognize a color shown by a combination of the average of brightness values of R, G and B of a pixel of each frame image data at each coordinate, so that it is possible to make people recognize the screen display image of the original electronic data. Consequently, it is possible to prevent content displayed on the screen from being accurately replicated.

Further, the system control unit 20 acquires electronic data and acquires still image data by converting the acquired electronic data, so that it is possible to more accurately recognize content of a screen display image of electronic data which can be displayed.

Furthermore, the system control unit 20 may increase the likelihood that a plurality of pixels having the same color on a screen display image of the original electronic data have different colors on frame image data, by determining a setting pattern of a brightness value for each frame image data per pixel at random. In this case, it is possible to make recognition of content of the original still image data from the replicated screen display image difficult.

Further, the system control unit 20 may perform conversion to reduce the difference between the minimum value and the maximum value of brightness values of pixels of a screen display image of the original electronic data, and make the average of brightness values of pixels of matching coordinates between frame image data equal to brightness values after conversion. In this case, it is possible to further prevent content displayed on the screen from being accurately replicated.

Further, the system control unit 20 may determine a frame rate of movie data, and determine the number of frames of movie data based on the determined frame rate. In this case, it is possible to determine the number of frames matching the frame rate and, consequently, make adjustment such that people who look at the screen can easily recognize a screen display image.

In addition, although, with the above embodiment, colors of pixels of matching coordinates in the original electronic data are varied between all pixels of frame image data, part of pixels may have the same color as the color of pixels of matching coordinates in the original electronic data.

Further, although, with the above embodiment, a setting pattern of a brightness value for each frame image data is changed per coordinate, that is, per pixel, the setting pattern of a brightness value may be changed in a unit of a wider screen display area than one pixel. For example, a screen display image of the original electronic data is divided into a plurality of regions, and setting patterns of brightness values are varied between the regions. More specifically, for example, the system control unit 20 creates the above conversion table per region. In this case, the system control unit 20 creates each conversion table such that the setting pattern of a brightness value for the same color or the same brightness value in the original electronic data varies between regions. Further, the system control unit 20 sets the brightness value to each frame image data by changing a reference conversion table per region. In addition, the setting patterns of brightness values only need to be varied between at least two regions of a plurality of regions.

Further, with the above embodiment, the average of brightness values of pixels of each frame image data is made completely equal to brightness values of pixels of a screen display image of the original electronic image data. However, as long as it is not disadvantageous for people who look at the screen which plays back generated movie data to recognize a screen display image of the original electronic image data or people's eyes cannot recognize the difference of colors, the average of brightness values of pixels of each frame image data and brightness values of pixels of screen display images of the original electronic image data may be slightly different (for example, about ±10). A range of this difference may be set in advance. Further, in this case, even if the gradation is not compressed and converted, it is possible to vary colors of pixels of each frame image data from colors of pixels of a screen display image of the original electronic data. However, the gradation may be compressed and converted even in this case. This compression conversion of the gradation can make the difference between colors of pixels of each frame image data and colors of pixels of a screen display image of the original electronic data more significant.

Further, although a color of a pixel is represented by a combination of three primary colors of light with the embodiment, for example, a combination of four primary colors may be used.

Furthermore, frame image data may be generated by dithering colors of the screen display image of the original electronic data. In this case, when, for example, an intermediate color is used for a screen display image of the original electronic data, colors of the screen display image of electronic data are represented by combining colors of a plurality of pixels on frame image data. In this case, from the view point of one pixel unit, the difference between the average of brightness values of pixels of matching coordinates between frame image data and brightness values of pixels of matching coordinates in the screen display image of electronic data does not settle in a predetermined range in some cases. That is, when only one pixel is focused upon, an average color of frame image data differs from the color of the screen display image of electronic data in some cases. However, from the view point of a predetermined range (for example, a range of three pixels in the vertical direction and nine pixels in the horizontal direction) formed with a plurality of pixels, a color to be recognized when people who look at the screen which displays movie data upon playback only needs to look the same as the color of the screen display image of electronic data. In this case, for example, the difference between the average of brightness values of a plurality of pixels in a predetermined range of each frame image data and brightness values of pixels in a range of matching coordinates in a screen display image of electronic data only needs to settle in a predetermined range.

REFERENCE SIGNS LIST

1 ELECTRONIC DATA CONVERTING DEVICE
11 OPERATION UNIT
12 DISPLAY UNIT
13 COMMUNICATION UNIT
14 DRIVE UNIT
15 MEMORY UNIT
16 INPUT/OUTPUT INTERFACE UNIT
17 CPU
18 ROM
19 RAM
20 SYSTEM CONTROL UNIT
21 SYSTEM BUS

The invention claimed is:

1. A data-generating device comprising:
at least one memory operable to store program code;
at least one processor operable to access said memory and read said program code and operate as instructed by said program code, said program code including:
acquiring code configured to cause at least one of said at least one processor to acquire still image data;
first generating code configured to cause at least one of said at least one processor to firstly convert each pixel value of the acquired still image data to different pixel values to reduce the difference between a minimum value and a maximum value of a pixel value, to use the converted each pixel value of the acquired still image data to generate a predetermined number of items of still image data in which at least part of pixel values of the acquired still image data are changed, and to make an average of pixel values of matching display positions between the predetermined number of items of still image data equal to pixel values of matching display positions in the acquired still image data and equal to the different converted pixel values of matching display positions in the acquired still image data; and
second generating code configured to cause at least one of said at least one processor to convert the acquired still image data into movie data by displaying each of the generated still image data at a predetermined frame rate,
wherein the first generating code is configured to further cause at least one of said at least one processor to reduce the difference between the minimum value and the maximum value of the pixel value according to the following equations:

in a case where $L1<Lmax/2$, $L2=L1+(K/(Lmax/2)\times((Lmax/2)-L1))$; and in a case where $L1>Lmax/2$, $L2=L1-(K/(Lmax/2)\times(L1-(Lmax/2)))$, where Lmax is a maximum value of a brightness value, L1 is a brightness value before compression conversion of an arbitrary primary color, L2 is a brightness value after compression conversion, and K is a constant having a value equal to or more than 1.

2. The data-generating device according to claim 1, wherein the second generating code is further configured to cause at least one of said at least one processor to determine a frame rate for display, and
the first generating code is further configured to cause at least one of said at least one processor to determine a number of items of still image data to generate based on the determined frame rate.

3. The data-generating device according to claim 1, wherein the second generating code is further configured to cause at least one of said at least one processor to determine a frame rate for display, and
the first generating code is further configured to cause at least one of said at least one processor to determine a number of items of still image data to generate based on the determined frame rate.

4. The data-generating device according to claim 1, wherein the first generating code is further configured to cause at least one of said at least one processor to determine a pixel value of the predetermined number of items of still image data such that each pixel value has an irregular value.

5. The data-generating device according to claim 1, wherein the first generating code is further configured to cause at least one of said at least one processor to vary a pattern of a pixel value to be set in the predetermined number of items of still image data for the same pixel value between at least two of a plurality of regions divided from an image shown by the acquired still image data.

6. The data-generating device according to claim 1, wherein the acquiring code is further configured to cause at least one of said at least one processor to acquire electronic data which can be displayed on a screen of a display device, and to convert the acquired electronic data into still image data.

7. A data-generating method of a data generation device, including at least one processor, the method comprising:

acquiring, using at least one of said at least one processor, still image data;

converting each pixel value of the acquired still image data to different pixel values to reduce the difference between a minimum value and a maximum value of a pixel value;

generating, using at least one of said at least one processor, using the converted each pixel value of the acquired still image data, a predetermined number of items of still image data in which at least part of pixel values of the acquired still image data are changed, and making an average of pixel values of matching display positions between the predetermined number of items of still image data equal to pixel values of matching display positions in the acquired still image data and equal to the different converted pixel values of matching display positions in the acquired still image data; and converting, using at least one of said at least one processor, the acquired image data into movie data by displaying the generated still image data is displayed at a predetermined frame rate, wherein the converting each pixel value of the acquired still image data to different pixel values to reduce the difference between a minimum value and a maximum value of the pixel value is performed according to the following equations:

in a case where $L1 < L\max/2$, $L2 = L1 + (K/(L\max/2) \times ((L\max/2) - L1))$; and in a case where $L1 > L\max/2$, $L2 = L1 - (K/(L\max/2) \times (L1 - (L\max/2)))$, where Lmax is a maximum value of a brightness value, L1 is a brightness value before compression conversion of an arbitrary primary color, L2 is a brightness value after compression conversion, and K is a constant having a value equal to or more than 1.

* * * * *